Feb. 17, 1959     T. B. GIBBS ET AL     2,873,572
MOTOR-DRIVEN CLOCK
Filed Feb. 11, 1955     4 Sheets-Sheet 1
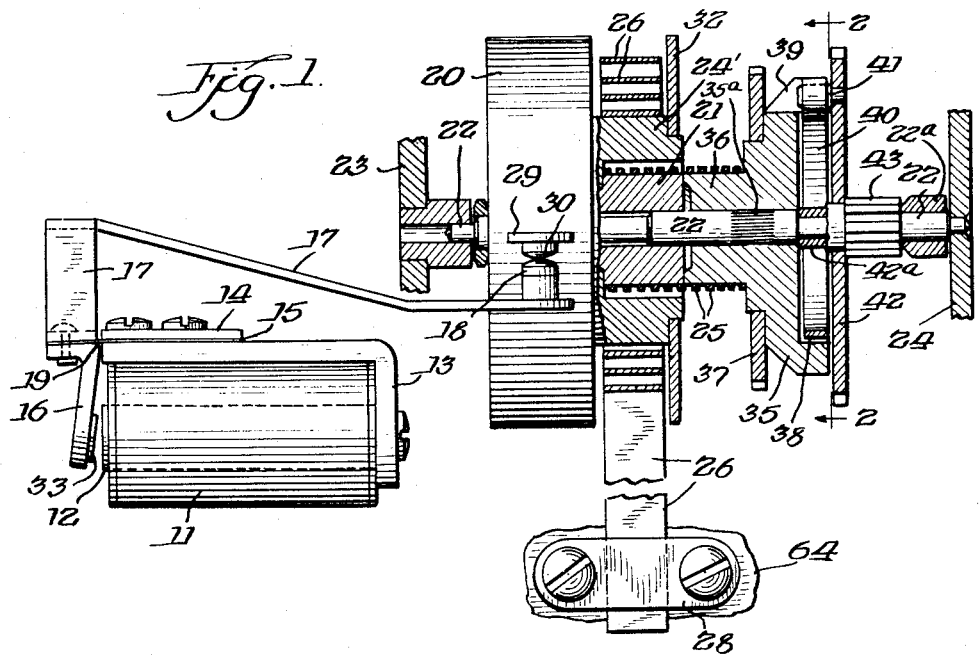
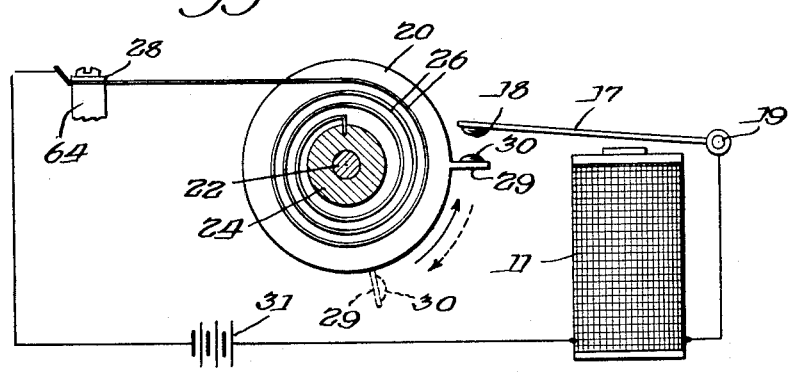
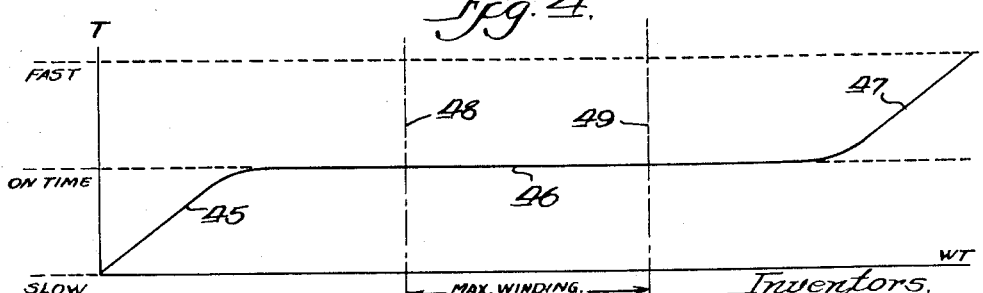
Inventors,
Thomas B. Gibbs &
Jean Fink.
By [signature] Atty.

Feb. 17, 1959     T. B. GIBBS ET AL     2,873,572
MOTOR-DRIVEN CLOCK
Filed Feb. 11, 1955     4 Sheets-Sheet 2
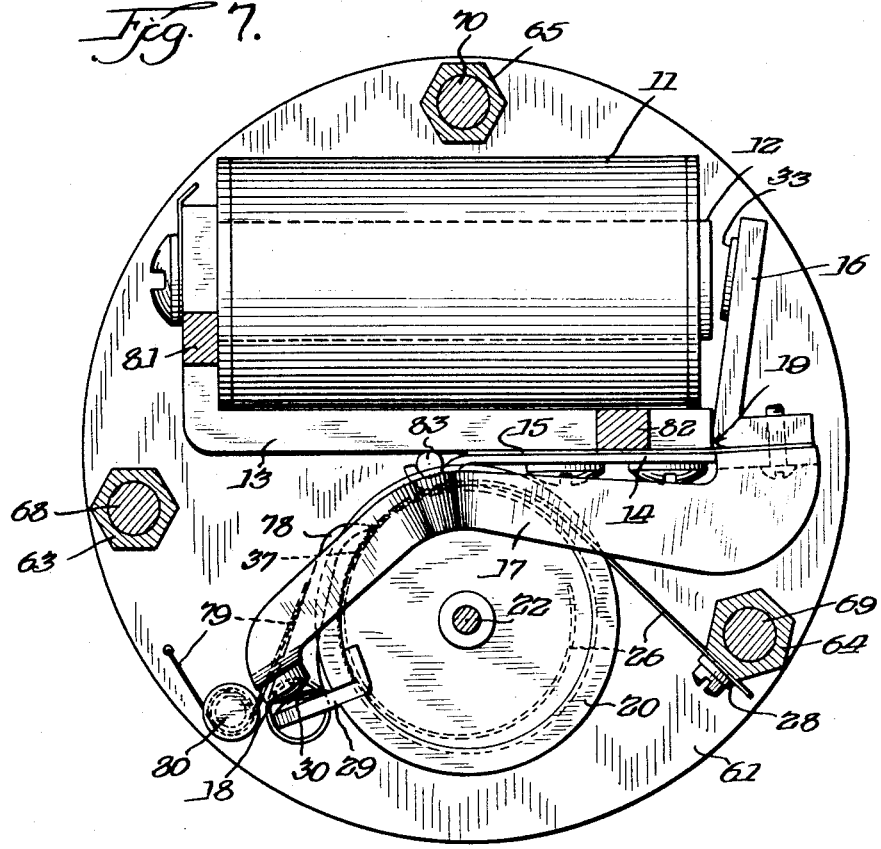
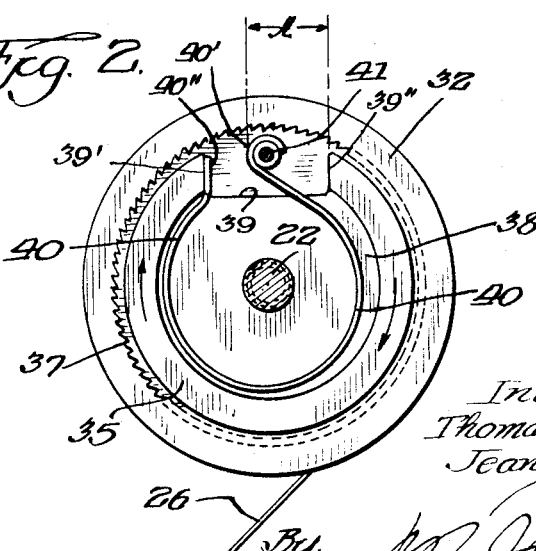
Inventors
Thomas B. Gibbs, &
Jean Fink.

Feb. 17, 1959  T. B. GIBBS ET AL  2,873,572
MOTOR-DRIVEN CLOCK
Filed Feb. 11, 1955  4 Sheets-Sheet 3
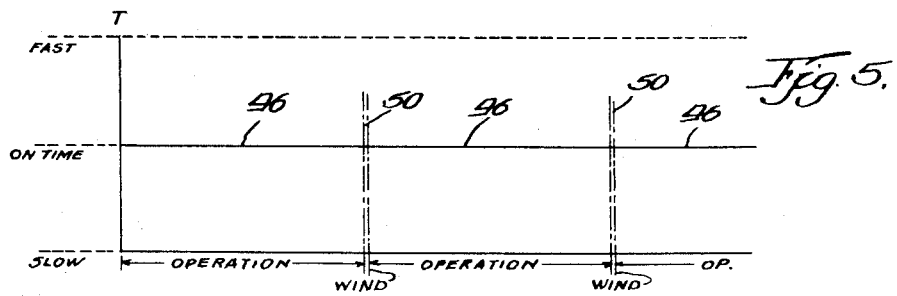
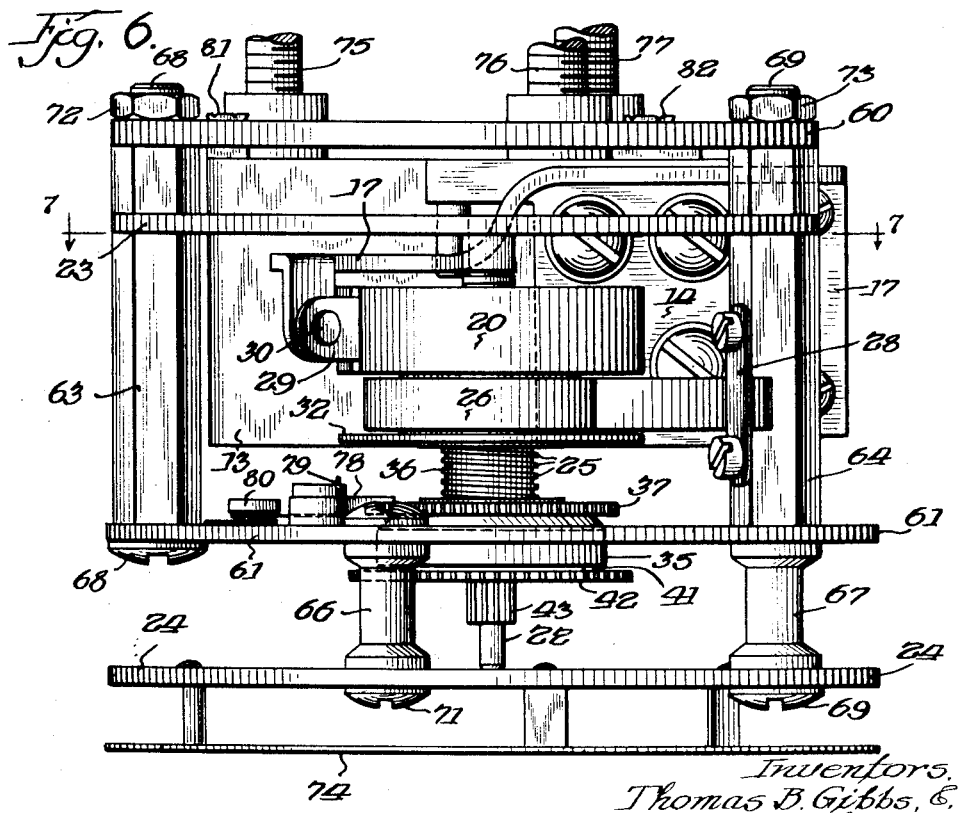

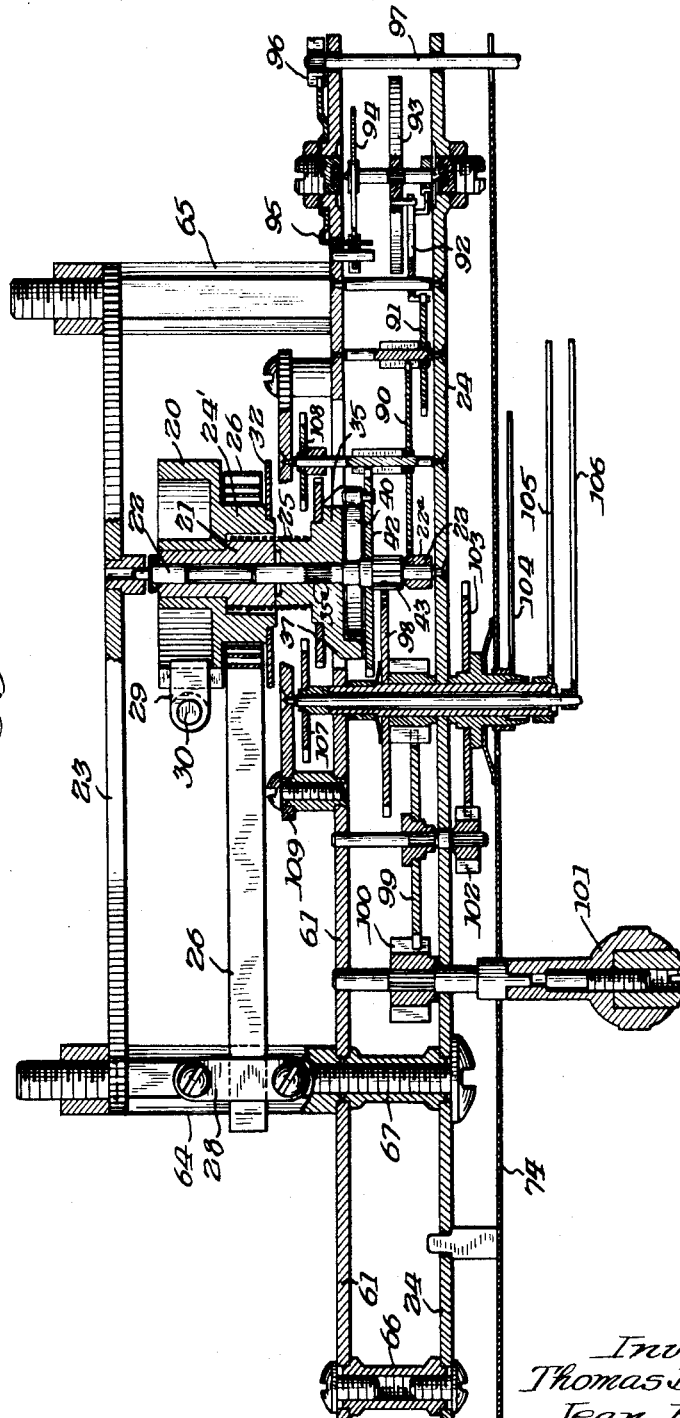

United States Patent Office 2,873,572
Patented Feb. 17, 1959

2,873,572

MOTOR-DRIVEN CLOCK

Thomas B. Gibbs, Delavan, and Jean Fink, Janesville, Wis., assignors, by mesne assignments, to Hamilton Watch Company, Lancaster, Pa., a corporation of Pennsylvania Application February 11, 1955, Serial No. 487,612

10 Claims. (Cl. 58—41)

This invention is concerned with a self-winding motor-driven clock for use, for example, in automobiles. The clock according to the invention comprises a spiral coiled mainspring and a motor for periodically successively winding such mainspring always for a predetermined portion of its torque curve which is most favorable for the clock operation, coupling means comprising a clutch member for coupling the clock operating mechanism with the mainspring only during the unwinding thereof, and auxiliary spring means for maintaining the clock operation during the periodic winding of the mainspring. The interval of winding will be referred to as the "winding cycle" and the interval of unwinding will be referred to as the "operating cycle," the term—operating—pointing to the operation of the clock mechanism.

Previously known and widely used motor-driven automobile clocks provide a cylindrical helical mainspring and a motor comprising an electromagnet and an armature controlled thereby for periodically successively winding such mainspring by extending it to store during each winding cycle power up to a peak torque, the stored power decreasing gradually down to a minimum torque during the next following operating cycle of the clock mechanism which is coupled with the armature by a ratchet drive.

Prior structures of the above indicated and similar types have among other shortcomings the serious drawback of storing driving power in the cylindrical helical mainspring which varies during the progressive contraction thereof, that is, during each operating cycle following a winding cycle, from a peak torque to a minimum torque. The application of such varying driving power may contribute toward causing the clock to run irregularly during some operating cycles, either faster or slower, particularly in the presence of varying battery current and under adverse temperature conditions.

Another drawback resides in the operation of the armature of such prior clocks and coincident extension (winding) of the mainspring to initiate the successive winding cycles. The proper operation of the armature, at definite instants, into its fully attracted position and consequently full winding of the mainspring to supply the desired driving power, depends on the battery condition and therefore on the voltage available for the energization of the motor magnet. Assuming, for example, fully charged condition of the battery and relatively small load thereon, substantially the full rated voltage will be available, and the motor magnet will be properly energized and will cause quick actuation of the armature to place it in fully attracted position so as to wind the mainspring fully for the corresponding winding cycle; but with rundown battery condition or with an overload on the battery and consequently reduced voltage, the armature may be displaced only into partly attracted position. It follows, therefore, first, that the instant of the change-over or start of successive winding cycles may be shifted and second, that the mainspring may not be fully wound during some winding cycles, depending on the available battery voltage. If the mainspring is not fully wound, it will supply correspondingly reduced driving torque for the clock during the next following operating cycle, thus further contributing to irregular operation.

The errors that may be introduced in prior motor-driven clocks by the factors mentioned above are cumulative and detrimentally affect the operation.

It may also be mentioned that such prior clocks do not operate entirely noiseless, the setting of the drive pawls relative to the ratchet being audible during the attraction of the armature, and that the current consumption is relatively great due to the fact that the winding of the mainspring is entirely a function of the angular displacement of the armature.

The primary object of the invention is to produce a motor-driven clock which avoids the drawbacks indicated in the foregoing explanations and which provides additional advantages and above all, to produce a clock which operates reliably and accurately even under stressed environmental conditions, for example, at extremely low temperatures.

The foregoing object and additional objects and features will appear from the detailed description which will be presently rendered with reference to the accompanying drawings. In these drawings—

Fig. 1 illustrates the salient mechanical features of the invention in convenient schematic simplified representation to aid in explaining the principle of operation, showing some parts in elevation and others in section;

Fig. 2 is a sectional view taken along line 2—2 of Fig. 1 to explain the function of the auxiliary spring for applying elastic driving torque to the drive gear wheel and for maintaining the clock operation during the intervals of winding the mainspring;

Fig. 3 represents a schematic circuit diagram;

Fig. 4 shows a curve to explain the torque of the mainspring and the winding thereof;

Fig. 5 is a similar curve in terms of operation of the clock according to the invention;

Fig. 6 is an elevational side view of the motor mechanism of the new clock, showing the various parts as they are actually formed and in their actual cooperative positions, the clock gear train being omitted for simplification;

Fig. 7 shows the motor mechanism as seen when looking in the direction of the arrows along line 7—7 in Fig. 6; and Fig. 8 shows the parts of the drive motor as they appear in Fig. 1, omitting the motor magnet and its armature and associated contact-carrying lever arm, and showing an example of the clock operating gear wheels and other parts in developed view.

Referring now particularly to Figs. 1, 2 and 3, numeral 11 indicates the coil of the electromagnetic drive motor which is in usual known manner disposed about the core 12 mounted on the yoke 13. Also mounted on the yoke 13, by means of the plate 14, is the leaf-spring 15. Secured to the free end of the leaf-spring are the armature 16 and the lever arm 17 carrying the contact point 18. The magnet structure is thus generally similar to a well known relay. The leaf-spring 15 is made of non-magnetic material, for example beryllium-copper and its width corresponds substantially to that of the yoke 13. The parts including the coil winding 11 may be in known manner suitably dimensioned so as to provide for reliable operative actuation of the armature 16 and the lever arm 17 with a current from a suitable source, for example, a battery adapted to supply current at 1½ to 12 volts.

The operating elements of the motor comprise an inertia mass which may be made in the form of a flywheel 20 having a hub 21 which is rotatable on the pivot shaft 22 suitably journalled in the frame plates 23 and 24. An annular skirt 24', which may be integral with the flywheel, as shown, for example, in Fig. 8, surrounds the hub 21 forming an annular recess therewith for accommodating a portion of the clutch spring 25 coiled about the hub 21. The inner end of the spiral coiled mainspring 26 is anchored to the flywheel skirt 24' and the other end thereof is secured on a suitable stationary structural part 64 by a clamp member 28. The mainspring is made of a suitable material, for example, beryllium-copper. It may be about .003" thick, about .125" wide and about 10" long. These dimensions are noted to give an example; they may be varied. Numeral 32 indicates an annular plate secured to the skirt 24' for retaining the mainspring. The flywheel 20 is provided with an arm 29 radially extending therefrom and carrying a contact point 30 for coaction with the contact point 18 carried by the lever arm 17. The unwinding of the mainspring 26, during each operating cycle, tends to rotate the flywheel 20 counterclockwise in the direction of the full line arrow shown in Fig. 3 so as to cause the contact point 30 to engage the contact 18 as shown in Fig. 1.

The operating circuit, diagrammatically shown in Fig. 3, extends from one terminal of the battery 31 to the winding of the magnet coil 11, thence through the yoke 13, and from there over the armature pivot including in the illustrated example the leaf spring 15 (shown in Fig. 1 but omitted in Fig. 3) and through the lever arm 17 to the contact 18. It will be understood, of course, that the armature may be pivoted on the yoke in a different manner, the showing in the drawings being simplified to give an example only. At the instant when the flywheel 20 has been rotated by the unwinding of the mainspring 26 to the position shown in Fig. 1, contact 30 will engage contact 18 and the circuit is thereby closed over the contact 30, arm 29, through the flywheel 20 and through the mainspring 26, and over the mounting 28, 64 back to the other terminal of the battery 31. The magnet coil 11 is accordingly energized and attracts the armature 16, thereby displacing the lever arm 17 counterclockwise, as seen in Fig. 3, to move the contact 18 relative to the contact 30 carried by the flywheel 20, thus initially rotating the flywheel positively, clockwise in the direction of the dotted arrow shown in Fig. 3, by an amount corresponding to the stroke of the contact 18, which exceeds the stroke of the armature due to the leverage provided by the lever arm 17. This initial positive rotation of the flywheel is effected with relatively great acceleration corresponding to the acceleration of the armature 16. The amount of angular positive displacement of the contact 18 exceeds that of the armature stroke to impart to the flywheel a sufficient positive driving force so as to insure continued rotation thereof by inertia, beginning at the instant when the armature 16 is in its fully attracted position. The amount of angular rotation of the flywheel by inertia depends on the acceleration imparted thereto by the positive drive effected by the contact 18. The amount of such inertia rotation may vary for reasons which will presently be explained. The flywheel 20 will thus be rotated and will place its arm 29 carrying the contact 30 in some angular position, for example, into the dotted position shown in Fig. 3. The mainspring 26 is wound by the rotation of the flywheel in accordance with a total angular displacement thereof. The above traced circuit over the contacts 30 and 18 is instantly opened upon completion of the attraction of the armature when the flywheel begins to continue to rotate by inertia. The magnet 11 is accordingly deenergized and the armature 16 with the associated lever arm 17 restore to normal position. Known and suitable provisions such as a spark quenching resistor and the like may of course be included in the circuit. They have been omitted to keep the drawings simple.

The pivot point of the contact 18 is at the shoulder of the armature 16 adjacent the end of the yoke 13, being marked by numeral 19, and the pivot point for the contact 30 coincides with the axis of rotation of the flywheel 20, that is, with the axis of the pivot shaft 22. The two pivot points are thus on different radii and, as will be more apparent later on when describing Figs. 6 and 7 which show the parts in structural position and configuration, they are oriented so as to provide for a powerful wiping action between the corresponding contacts, keeping the contacts clean.

The energizing circuit for the magnet coil extends, as stated before, over the mainspring 26, over the flywheel 20, over the yoke 13, the leaf-spring 15 and lever arm 17, thus providing an efficient circuit path throughout. Beryllium-copper has been mentioned as a material for the mainspring and for the leaf-spring because it provides the desired properties, toughness and resilience, similar to steel. Other suitable material having the desired properties may be used. Either or both springs may be made of steel, silver-plated if desired so as to form a relatively low resistance path. It is understood, of course, that the leaf-spring 15 is suitably dimensioned so as to provide for the strong springy force which is required for restoring the armature 16 and the associated lever arm 17 to normal position upon deenergization of the magnet coil.

In order to prevent an audible impact click each time the armature is attracted, the invention provides a resilient yieldable padlike insert 33 on the inside of the armature 16. This insert may be made of suitable plastic material or of rubber and the like and may, of course, be carried by the core 12 instead of by the armature, for example, in the form of a pad or in the form of a generally mushroom-shaped member having its shank disposed in a shallow recess in the core. The insert dampens in either case the operative impact of the armature on the core 12, furnishing substantially noiseless operation, and provides a gap in operated position of the armature sufficient to cause proper restoration thereof upon deenergization of the magnet coil 11. A member 83 shown in Fig. 7 may be provided to define the restored position of the lever arm 17 (and therewith of the armature) relative to the yoke, and such member may likewise be made of resilient material to dampen the restoring operation.

The flywheel 20 is rotatable on the shaft 22 and the corresponding pivot may be oiled if desired. The pivot is included in the energizing circuit. It is believed that, if an oiled pivot is present an electrolytic action may take place which may inhibit an increase of viscosity of the oil at low temperatures. The clock according to the invention can be safely operated at temperatures as low as minus (—) 40° F. The current flowing through the energizing circuit may be properly polarized so as to avoid any plating action that might occur when using certain materials for the pivot pin and for the hub of the flywheel, thus avoiding detrimental effects on the corresponding journal.

Returning again to the description of the operating elements of the drive motor, there is provided a bushinglike driven member 35 having a hub 36 about which is coiled a portion of the clutch spring 25. The driven member 35 is keyed to the shaft 22 as indicated at 35a and carries the ratchet wheel 37 fixed thereon. A detent, omitted in Fig. 1, but shown in Fig. 7 at 78 as carried by the frame member 61, is provided for preventing rotation of the driven member 35 and therewith of the shaft 22 in one direction of rotation. The driven member 35 is provided with a recess 38 and with a peripheral cutout 39 for receiving an auxiliary spring 40 for elastically driving the drive wheel 42 and pinion 43 to drive the clock mechanism during the operating cycles and for maintaining the clock operation during winding cycles.

The drive wheel 42 with its pinion 43 are rotatable on the shaft 22. Numeral 22a indicates a securing member for holding the pinion 43 and drive wheel 42 in assembled position with the remaining parts on the shaft 22.

As shown in Fig. 2, one end 40' of the spring 40, which may be briefly referred to as maintaining spring, is secured to a post 41 extending from a drive wheel 42 (see also Fig. 1), and the other end 40" of the spring 40 bears against the wall 39' of the cutout 39. The pinion 43 is in driving engagement with the center wheel 98 of the clock mechanism in a manner that will be described in connection with Fig. 8. This center wheel and also the remaining gear wheels and other parts of the clock mechanism have been omitted from Fig. 1 to keep it simple.

It will be seen from the foregoing explanations that a portion of the clutch spring 25 is coiled about a hub 21 extending from the flywheel 20 while the remaining portion of such clutch spring is coiled about the hub 36 of the driven member 35 containing the maintaining spring 40. During the winding of the mainspring 26 by the flywheel, incident to rotation thereof, as described before, the hub 21 and therewith the flywheel 20 will rotate unimpeded, in free-wheeling manner, without affecting the hub 36 of the driven member 35. This free-wheeling action is secured by the clutch spring 25 which is affected during the winding of the mainspring in an unwinding or opening sense. Some frictional force, however slight, is however produced on the hub 36 of the driven member 35. In order to prevent rotation of the driven member 35 responsive to such slight frictional force on the hub 36 during the winding cycles, there is provided a ratchet 37 coacting with a detent omitted in Fig. 1, but shown in Fig. 7 at 78. The driven member 35 is thus positively held against rotation with the flywheel 20 during the winding of the mainspring. The electrical circuit is opened at the instant when the flywheel begins to rotate by inertia, and the armature 16 and associated lever arm 17 with its contact 18 are accordingly restored to normal inoperated position. The mainspring is wound up at the conclusion of the inertia rotation of the flywheel and its tension exerts a force which tends to rotate the flywheel in the opposite direction. The clutch spring 25 is now affected in a tightening sense, by the corresponding rotation of the flywheel, clutching the hub 36 of the driven member 35 positively with the hub 21 of the flywheel so as to rotate this driven member 35 by the torque exerted by the mainspring 26. The driving torque is thus applied in steady and even manner for the duration of the next following operating cycle.

The driven member 35, upon rotating, exerts pressure on the end 40" of the maintaining spring 40, which bears against the wall 39' of the cutout 39, as indicated in Fig. 2. The other end 40' of the maintaining spring 40 is coiled about the post 41 extending from the drive gear wheel 42 (see Fig. 1). This drive gear wheel and its associated pinion 43 are in mesh with certain wheels of the clock mechanism, and the pressure exerted on the end 40" of the maintaining spring thus produces an elastic driving pressure on the post or pin 41 and therewith on the drive gear wheel 42, thereby rotating such drive gear wheel and the associated pinion 43 to transmit driving torque to the clock mechanism. The maintaining spring 40 is thereby compressed by a certain amount, for example, by the amount A indicated in Fig. 2, keeping the end 40' of the spring 40 and the post 41 spaced from the wall 39" of the cutout 39. The exact amount of compression of the maintaining spring depends, of course, on the torque required for driving the clock mechanism. The clock now goes through the operating cycle following the winding cycle effected by the angular displacement of the flywheel.

It will be seen, therefore, that the auxiliary or maintaining spring 40 is disposed in series with the mainspring 26, the torque of the mainspring being effective to compress the maintaining spring so as to produce torque for driving the clock mechanism for the interval of the corresponding operating cycles.

During such operating cycle, the flywheel 20 is rotated in the direction of the full line arrow indicated in Fig. 3, back to its start or initial position in which it is shown in Fig. 1, and consequently moves its arm 29 and contact 30 accordingly. The contact 30 will eventually engage the contact 18 on the lever arm 17 and upon such engagement, the previously traced circuit will be closed again and the magnet coil 11 will be energized to attract the armature 16 so as to displace the lever arm 17 as described before, thus initiating the next successive winding cycle by moving the contact 18 with accelerated force relative to the contact 30 of the flywheel so as to rotate the flywheel positively, thereby imparting acceleration thereto to cause inertia rotation of the flywheel for completing the winding cycle as already explained in detail.

Each winding cycle therefore includes initial positive rotation of the flywheel followed by inertia rotation thereof. The winding of the mainspring begins at the instant of starting the positive rotation of the flywheel and ends with the termination of inertia rotation thereof.

The interval required for the winding of the mainspring during each winding cycle is very brief. The maintaining spring 40 assures the proper continued operation of the clock mechanism for this very brief interval of a few milliseconds. As previously explained, the torque exerted by the mainspring 26 on the driven member 35, during an operating cycle, compresses the maintaining spring 40 by an amount such as A in Fig. 2, causing it to exert elastic driving torque on the post 41 of the clock drive gear wheel 42. Upon cessation of the rotation of the driven member 35, at the instant when the flywheel has been rotated back to its initial or start position to close the circuit for the energization of the magnet coil 11, the maintaining spring 40 will expand within the range of the amount A of its compression or contraction and will accordingly continue to exert torque on the pin 41 to continue rotation of the drive gear wheel 42, thereby maintaining the operation of the clock mechanism for the brief interval required for the winding cycle. A reactive force is thereby initially exerted on the driven member 35, attempting to rotate it in a direction opposite to the direction of rotation during the operating cycle under the control of the mainspring. Such reactive force is counteracted by frictional forces set up by the rotation of the drive wheel and pinion 42/43 on the shaft 22 relative to the bushinglike member 35 which is fixed on the shaft and held against rotation with the drive wheel and pinion 42/43 by the detent coacting with the ratchet 37, omitted in Fig. 1 but shown in Fig. 7 at 78.

The ratchet 37 and the detent 78 have in this manner in conjunction with the particular arrangement of the driving member 35 (fixed on the shaft 22) and the drive wheel and pinion 42/43 (rotatable on the shaft 22) the dual function of absorbing the reactive force applied at the start of winding cycles by the maintaining spring 40 and of counteracting slight frictional forces exerted at the same time by the clutch spring 25, all of which tend to rotate the driven member 35 in a direction opposite to the direction of rotation during the operating cycle. The driven member 35 is accordingly held stationary during the winding cycle, and the expansion of the maintaining spring 40 is utilized for supplying driving torque to the drive gear wheel 42 for the brief interval of the winding cycle without producing any "back lash" that might affect the proper operation.

It will be appreciated from the foregoing explanations that the compression of the maintaining spring 40 during the operating cycles serves the twofold purpose of applying elastic drive torque to the drive gear wheel 42 of the clock mechanism and of storing energy for maintaining the operation of the clock mechanism during the winding cycle following each operating cycle.

It is obvious, of course, that the maintaining spring 40 must be strong enough to supply torque required to maintain the rotation of the drive gear wheel of the clock mechanism, and it follows, therefore, that the mainspring 26 must be stronger than the maintaining spring 40 because its force must be able to compress the maintaining spring so as to store the energy required for driving the drive gear wheel during each operating cycle and for maintaining its rotation during the subsequent winding cycle.

The above described operations are periodically successively repeated. Each winding cycle for the mainspring is followed by a drive or operating cycle executed by the clock mechanism under the driving force exerted by the wound mainspring and the serially related auxiliary maintaining spring, and the operation is sustained or maintained for the duration of each winding cycle by the maintaining spring. The clock thus operates automatically continuously so long as battery current is available and capable of supplying sufficient energy to effect energization of the drive magnet so as to attract its armature with a force capable of moving the flywheel by engagement of the contact 18 with the flywheel contact 30, to cause some angular displacement of the flywheel.

The winding of the mainspring is effected for a portion of its torque curve which is most favorable for the operation of the clock mechanism. The manner in which this is done will now be explained with reference to Figs. 4 and 5.

Referring first to Fig. 4, the curve shown is assumed to be the torque curve of a spiral coiled spring, the torque T being related to the winding time WT. The torque curve shows an initial rise 45 which occurs upon winding the spring from its completely unwound condition, causing the spring to store gradually increasing force. The next following portion 46 is a flat portion during which the spring stores a substantially constant and uniform force. The winding during the tail portion 47 concludes the winding of the spring to tightly wound position, again causing the spring to store gradually increasing force. The torque force delivered by such spring proceeds in reverse order. Assuming the spring to be the mainspring of a clock and assuming it to be tightly wound (tail portion 47), excess power will be initially supplied, tending to make the clock run off-time. The excess force gradually tapers off to the flat portion 46 during which constant and uniform torque is delivered, tending to make the clock run on time. Further unwinding of the mainspring during the portion 45 will deliver rapidly decreasing torque tending to make the clock run off-time again. Errors are thus introduced during the unwinding of the spring within the portions 45 and 47 of the torque curve.

It might occur to those not highly skilled in the art that the errors introduced during the portions 45 and 47 of the torque curve could be made to cancel each other. Such tendency, while it exists to some extent, cannot be relied upon and cannot result in proper "On Time" operation because it would require winding invariably at a predetermined low point of the torque portion 45 up to a precisely predetermined high point of the torque portion 47. Such precise winding would require among other features constant battery current and constant friction conditions, all of which are in actual practice variable, making such precise winding manifestly impossible. The errors which predominate at any instant of the operation, in one or the other direction, will accordingly cause the clock to run correspondingly fast or slow as the case may be.

It is believed that correct "On Time" operation can be achieved, among other considerations, by utilizing for the operation of the clock mechanism only the flat portion 46 of the torque curve during which the mainspring delivers substantially constant and uniform torque.

This principle is applied in the clock made according to the invention. The winding cycle, regardless of variable operating conditions including variable current and frictional factors, always starts at a point on the torque curve which lies within, and preferably well within, the flat portion 46 in Fig. 4, for example, at a point coinciding substantially with the start line 48 and always terminates at a point which lies well within the flat portion somewhere between the line 48 and the line 49. It will be realized in this connection that the precise start and the precise termination of the winding cycle are for all practical purposes immaterial so long as they are effected along the flat portion 46 of the torque curve. Utilization of a substantial part of the flat torque portion 46 is of course preferred for reasons of economy of operation. The length of the flat torque portion that is actually utlized will depend on the battery current and other variable factors including friction in the moving parts which may change with temperature variations.

The starting point for each winding cycle, for example, along line 48 in Fig. 4, is determined by mechanically placing the normal angular position of the flywheel so that its contact point 30 engages the contact point 18 on the armature lever arm 17 at an angular position in which the mainspring is correspondingly partially unwound. Residual force to the extent of the torque curve at the left of the start line 48, is still stored in the mainspring. Such force determines the contact pressure between the contact points 30 and 18 and thus secures the energizing circuit at the start of the operation. The terminal point for each winding cycle, which may be somewhere between the start line and the line 49 in Fig. 4 is determined by the total angular displacement of the flywheel including its positive accelerated displacement by the action of the contact 18 relative to the contact 30 incident to the accelerated attraction of the armature 16 and corresponding rotation of the lever arm 17, and also including its further angular displacement by inertia depending on the acceleration imparted during the positive displacement. The angular displacement of the flywheel is a function of factors including the force of attraction of the drive magnet and the stroke of the armature and the leverage provided by the lever arm 17. All of the corresponding factors can be initially provided as desired, assuming predetermined battery current, by proper dimensioning of the mechanical parts and of the coil as well as the magnet circuit. Variable factors such as decreased current, will merely operate to shift the terminal points of the winding cycles nearer to the start line. The corresponding winding cycles will be shorter but the accuracy of operation will not be affected.

It will be appreciated, therefore, that the flat portion 46 of the torque curve of the spiral coiled mainspring, or a desired part thereof, can be utilized for the winding cycle in accordance with the intentions of the invention.

The resulting operation of the new clock is illustrated in Fig. 5. A part of the flat portion 46 of the torque curve of the mainspring becomes repeatedly operable during the successive operating cycles of the clock mechanism, furnishing substantially constant and uniform driving torque. The winding intervals 50 interposed between the operating cycles 46 are bridged by the driving torque applied by the maintaining spring 40 in a manner described previously. The clock mechanism thus receives driving torque of substantially uniform and constant magnitude to sustain its operation. Since there are practically no variations in torque, substantially no errors will occur and the clock mechanism will tend to run "On Time."

Fig. 6 illustrates an embodiment of the invention showing particularly the motor parts in side view, and Fig. 7 shows these parts as seen when looking in the direction of the arrows along line 7—7 in Fig. 6. The various parts are shown in these figures on an enlarged scale but substantially in their true shapes and cooperative relationship. The gears of the clock operating mechanism controlled by the gear drive wheel 42 and pinion 43, appearing in Fig. 8, have been omitted in Figs. 6 and 7 to keep these drawings simple. Elements shown in Figs. 6 and 7 which correspond to like elements indicated in Figs. 1, 2 and 3 are indicated by like reference numerals.

Referring now to Figs. 6 and 7, numerals 60, 61, 24 designate frame plates which may be of circular shape in accordance with the usual circular formation of clocks. The frame plate 60 is made of insulating material. Numeral 23 indicates a bridge member for journalling the shaft 22. The bridge member 23 and the frame plate 24 are also shown in Fig. 1. The frame plates and the bridge member are connected by posts 63, 64, 65 and spacers 66, 67 and secured by suitable means such as threaded bolts 68, 69, 70 and 71 and nuts such as 72 and 73. Numeral 74 indicates the face or dial plate of the clock which is suitably fastened on the frame plate 24. The gear train of the clock operating mechanism (not shown in Figs. 6 and 7 with the exception of drive gear wheel 42 and the pinion 43) is disposed mainly between the frame plate 61 and 24 as will be presently described in connection with Fig. 8. Numerals 75, 76 and 77 indicate mounting studs.

The elements disposed on the shaft 22 include those described with reference to Figs. 1 to 3, namely, the flywheel 20 with its arms 29 and contact 30, the spiral coiled mainspring 26, one end of which is secured to the post 64 by the clamp 28 as shown, the driven member 35 and the drive gear wheel and pinion 42/43, with the maintaining spring 40 as a coupling member disposed therebetween, and the clutch spring 25 for coupling the driving member with the flywheel. These parts form a unitary subassembly for insertion into and removal from the mechanism as a unit. Numeral 32 indicates the annular plate for securing the mainspring in its position. A portion of the clutch spring 25 is coiled about the hub 36 of the bushinglike driven member 35 which also carries the ratchet 37. The maintaining spring is disposed in the lower part of the driven member 35 as described with reference to Figs. 1 and 2. Associated with the ratchet 37 is the detent 78 which is held in engagement therewith by means of the spring 79 coiled about the post 80. One end of the spring 79 is anchored in the frame plate 61 as particularly shown in Fig. 7. The drive magnet comprises the coil 11 disposed on the core 12 extending from one leg of the yoke 13. The yoke is provided with ears 81 and 82 which extend through holes in the insulating frame plate 60 and are peened over as particularly shown in Fig. 6, so as to hold the drive magnet in place depending from the frame plate 60. The armature 16 is pivotally mounted on the yoke 13 by a thin leaf-spring 15 held by a plate 14, all as described before. The plate 14 extends rearwardly as shown in Fig. 7 to latch with a member 83 so as to dispose the armature in proper position. As mentioned before, this member 83 may be made of resilient material so as to dampen the release operation of the contact-carrying lever arm 17 and therewith of the armature 16. The drive magnet with all its associated parts is in this manner mounted in insulated manner relative to the remaining structure, thereby securing the energizing circuit. The wiring of the circuit has not been shown in Figs. 6 and 7 as it may conform to common practice.

It will be seen from Fig. 7 that the pivot point 19 for the contact 18 on the lever arm 17 is oriented with respect to the pivot 22 for the contact 30 in such a manner that the contacts 18 and 30 will coact to produce a powerful wiping action thus keeping these contacts clean. The stroke of the contact 18 is greater than that of the armature, due to the leverage provided by the lever arm 17 and may be several times that of the armature. The insert 33 on the armature 16 dampens and prevents an audible impact of the armature incident to its attraction. Such insert may be differently shaped and may be carried by the core 12 instead of by the armature.

Fig. 8 shows the motor parts including the flywheel 20 and associated driven elements in the same manner as they are shown in Fig. 1, except that the flywheel has been shown in section. All the corresponding parts from the flywheel 20 down to the drive gear wheel 42 and pinion 43 are assembled as a unit for mounting in the clock as shown. The magnet and its insulated mounting as well as the armature actuated by the magnet have been omitted in Fig. 9. The various gear wheels and other parts of the clock operating mechanism are shown in Fig. 8 in developed view, that is, they are conveniently shown one next to the other in a common journal plane instead of in their true cooperating relationship in which they are in known manner angularly relatively displaced so as to assemble them on the circular frame plates. It will be understood that the particular gear train illustrated in Fig. 8 indicates merely an example; it may comprise different parts in different relationship as may be desired or required in actual practice.

The drive gear wheel 42 with its pinion 43 are periodically positively driven, for the duration of corresponding operating cycles, by the torque force stored in the mainspring 26, in a manner described in detail before. The maintaining spring 40 sustains the operation for the brief intervals of the intervening winding cycles, also as described before. The drive gear wheel 42, in the example shown, rotates the intermediate gear wheel 90, and the latter actuates the escape wheel 91. Numeral 92 indicates the escape lever and 93 the balance wheel which is controlled by the hair spring 94. The hair spring may be regulated by the arm 95 through the medium of a gear wheel 96 carried by the regulator shaft 97. The latter may be provided with a suitable knob or the like.

The pinion 43 which coacts with the drive gear wheel 42 also rotates the center wheel 98 and the latter rotates the motion wheel 99. The motion wheel 99 may also be rotated by gearing it with the center motion pinion 100 responsive to actuation of the knob 101. The motion wheel 99 is provided with a pinion 102 meshing with the wheel 103 for driving the hour hand 104. The minute hand 105 is controlled from the center wheel 98. A sweep second hand 106 may be provided and driven by suitable gearing from a sweep second wheel such as indicated at 107 or 108. The particular gearing for this purpose has been omitted because it forms no essential part either of the clock operating mechanism or its drive according to the invention. Numeral 109 indicates a small bridge mounted on the frame plate 61 for journalling the central wheel assembly and the intermediate wheel 90.

It will be seen from the foregoing explanations that the invention provides a clock which can be efficiently manufactured, assembled and operated, free of drawbacks inherent in prior structures, and which is adapted to operate reliably and with improved accuracy even under greatly adverse environmental conditions. The current consumption is reduced to a minimum as the electromagnet is energized only for a fraction of the interval required for the winding of the mainspring.

The use of the relatively long spiral coiled mainspring which is wound up only within the flat torque portion thereof results in particular advantages not mentioned before. The coils of such spring do not touch within the flat torque portion, thus avoiding friction during the winding as well as during the unwinding. The force required for winding is reduced to a minimum and the torque delivered by the spring is at a desired and favorable constant optimum.

The amount of compression of the maintaining spring 40, as indicated in Fig. 2 at A, provides for an expansion which furnishes driving torque for the clock gear train for an interval appreciably in excess of the interval required for winding the mainspring.

Changes may be made within the scope and spirit of the appended claims which define what is believed to be new and desired to have protected by Letters Patent

We claim:

1. A motor-driven self-winding clock comprising an assembled unit including a shaft, a balanced inertia mass rotatable on said shaft near one end thereof, a spiral coiled mainspring having one end thereof anchored in said inertia mass and the other end anchored to a stationary part of said clock, a driven member rotatable with said shaft adjacent said inertia mass, said driven member having a recess formed therein, a cylindrical clutch spring coiled about a portion of said inertia mass and a portion of said driven member, respectively, an auxiliary generally bow-shaped spring disposed in said recess formed in said driven member, a drive gear wheel rotatable on said shaft near the other end thereof, said drive gear wheel facing said bow-shaped spring in the recess formed in said driven member, a post extending from said drive gear wheel in the direction of said recess in said driven member, one end of said bow-shaped spring being in engagement with said driven member and the other end thereof being in engagement with said post, means in said clock for mounting said unit therein comprising spaced plates for rotatably journalling said shaft at the opposite ends thereof, means for securing the other end of said mainspring, an electromagnet having a pivotally mounted armature, and circuit means for periodically energizing said electromagnet to attract said armature for the purpose of positively rotating said inertia mass to impart acceleration thereto so as to cause rotation thereof by inertia to wind said mainspring, said mainspring producing a torque upon subsequent unwinding thereof for rotating said driven member to tension said auxiliary spring, said auxiliary spring applying torque to said drive gear wheel to rotate it for operating the gear train of said clock.

2. In a self-winding electric clock having a drive gear wheel for operating an associated gear train and including an electromagnet and drive elements periodically controlled thereby for producing torque for driving said drive gear wheel, said elements being assembed to form a unit for mounting in said clock and being as a unit removable therefrom, said assembled elements comprising a shaft, a driving member disposed rotatably on said shaft, a mainspring for applying upon unwinding torque to said driving member to rotate it in one direction of rotation thereof, a driven member keyed to said shaft, a helical cylindrical clutch spring for coupling said driven member for rotation with said driving member when said driving member is rotated responsive to the torque applied thereto by said mainspring upon unwinding thereof, and means for coupling said drive gear wheel for rotation with said driven member.

3. In a motor-driven electric clock having a frame and a gear train disposed therein and including a drive gear wheel, a device for driving said drive gear wheel to drive said gear train, said device comprising a rotatably mounted shaft, said drive gear wheel being rotatable on said shaft, a balanced inertia mass disposed for rotation on said shaft and adapted to operate in the manner of a flywheel, a hub extending axially from said inertia mass, a spiral coiled mainspring having its inner end fastened to said inertia mass and having its outer end anchored on a stationary part of said frame, means for periodically rotating said inertia mass in one direction of rotation to wind up said mainspring, said mainspring being operative during the unwinding thereof to rotate said inertia mass in opposite direction of rotation, a driven member keyed to said shaft and having a hub axially extending therefrom, a helical cylindrical clutch spring embracing said hub extending from said inertia mass and said hub extending from said driven member, said clutch spring being operative to couple said driven member for rotation with said inertia mass only during the unwinding of said mainspring, and actuating means controlled by said driven member for driving said drive gear wheel to drive said gear train.

4. In a motor-driven electric clock having a frame and a gear train disposed therein and including a drive gear wheel, a device for driving said drive gear wheel to drive said gear train, said device comprising a rotatably mounted shaft, said drive gear wheel being rotatable on said shaft, a balanced inertia mass disposed for rotation on said shaft and adapted to operate in the manner of a flywheel, a hub projecting axially centrally from said inertia mass and a circular extension projecting likewise axially therefrom and forming with said hub an annular recess, a spiral coiled mainspring having its inner end fastened to said circular extension on the outside thereof, a post disposed in said frame remote from said inertia mass, means for securing the outer end of said mainspring to said post, means for periodically rotating said inertia mass in one direction of rotation to wind up said mainspring, said mainspring being operative during the unwinding thereof to rotate said inertia mass in opposite direction of rotation, a driven member keyed to said shaft and having a hub axially extending therefrom, a helical cylindrical clutch spring embracing with one end thereof within said recess said hub projecting axially centrally from said inertia mass and embracing with the other end thereof said hub extending from said driven member, said clutch spring being operative to couple said driven member for rotation with said inertia mass only during the unwinding of said mainspring, and actuating means controlled by said driven member for driving said drive gear wheel to drive said gear train.

5. In a motor-driven electric clock having a frame and a gear train disposed therein and including a drive gear wheel, a device for driving said drive gear wheel to drive said gear train, said device comprising a rotatably mounted shaft, said drive gear wheel being rotatable on said shaft, a balanced inertia mass disposed for rotation on said shaft and adapted to operate in the manner of a flywheel, a hub extending axially from said inertia mass, a spiral coiled mainspring having its inner end fastened to said inertia mass and having its outer end anchored on a stationary part of said frame, means for periodically rotating said inertia mass in one direction of rotation to wind up said mainspring, said mainspring being operative during the unwinding thereof to rotate said intertia mass in opposite direction of rotation, a driven member keyed to said shaft and having a hub axially extending therefrom, a helical cylindrical clutch spring embracing said hub extending from said inertia mass and said hub extending from said driven member, said clutch spring being operative to couple said driven member for rotation with said inertia mass only during the unwinding of said mainspring, an auxiliary spring disposed within a recess formed in said driven member, one end of said auxiliary spring being in engagement with said driven member and the other end thereof being fastened to said drive gear wheel, said auxiliary spring being tensioned by the rotation of said driven member with said inertia mass to transmit elastic torque to said drive gear wheel for the purpose of rotating said gear train.

6. A structure and cooperation of parts according to claim 5, wherein said driven member is caused to stop at the conclusion of the unwinding of said mainspring and for the duration of the subsequent winding operation thereof, pawl and ratchet means for securing the corresponding stopping of said driven member, said auxiliary spring continuing to apply torque to said drive gear wheel for the duration of said subsequent winding of said mainspring.

7. In an electric clock having a gear train, a device for driving said gear train, said device comprising a rotatable shaft, a drive gear wheel rotatable on said shaft and controlling said gear train, a flywheel rotatable on said shaft, a mainspring anchored to said flywheel and to a stationary part of said clock, means for periodically rotating said flywheel in one direction of rotation to wind up said mainspring, a driven member keyed to said shaft, said mainspring causing upon unwinding thereof rotation of said flywheel in opposite direction, and a helical cylindrical clutch spring connected with said flywheel for positively rotating said driven member only during the rotation of said flywheel in said opposite direction to rotate said drive gear wheel for the purpose of driving said gear train.

8. An arrangement and cooperation of parts according to claim 7, comprising an auxiliary spring disposed between said driven member and said drive gear wheel, said auxiliary spring being tensioned incident to rotation of said driven member responsive to rotation of said flywheel in said opposite direction to apply torque to said drive gear wheel to cause rotation thereof for driving said gear train.

9. In an electric clock having a gear train, a device for driving said gear train, said device comprising a rotatable shaft, a drive gear wheel rotatable on said shaft and controlling said gear train, an inertia mass rotatable on said shaft, a mainspring anchored to said inertia mass and to a stationary part of said clock, means for periodically rotating said inertia mass in one direction of rotation to wind up said mainspring, a driven member keyed to said shaft, said mainspring causing upon unwinding thereof rotation of said inertia mass in opposite direction, and a one way clutch connected with said inertia mass and driven member for positively rotating said driven member only during the rotation of said inertia mass in said opposite direction to rotate said drive gear wheel for the purpose of driving said gear train.

10. A device as set out in claim 9 including an auxiliary spring disposed between said driven member and said drive gear wheel, said auxiliary spring being tensioned incident to rotation of said driven member responsive to rotation of said inertia mass in said opposite direction to apply torque to said drive gear wheel to cause rotation thereof for driving said gear train.

References Cited in the file of this patent
UNITED STATES PATENTS

| | | |
|---|---|---|
| 656,796 | Thompson et al. | Aug. 28, 1900 |
| 1,802,334 | Carlson | Apr. 28, 1931 |
| 2,146,119 | Hobbs | Feb. 7, 1939 |
| 2,519,713 | Steinmann | Aug. 22, 1950 |